J. PICHOUD.
VEHICLE SPRING.
APPLICATION FILED APR. 5, 1915.
1,147,439.
Patented July 20, 1915.
2 SHEETS—SHEET 2.
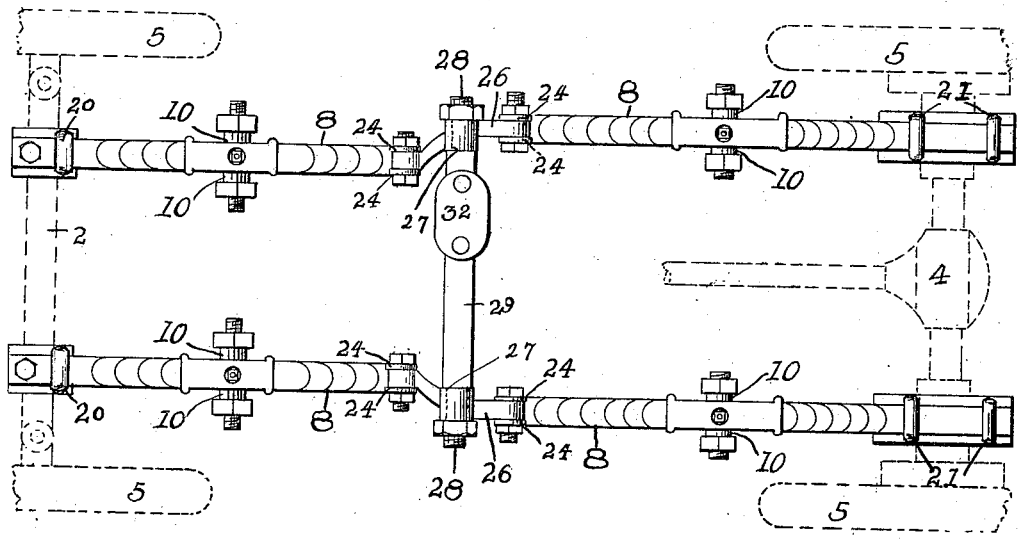
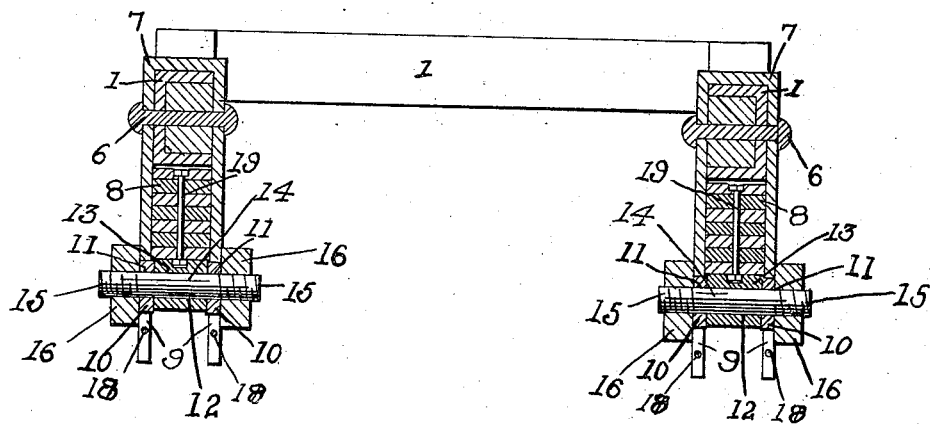
Witnesses
Ira M. Jones.
M. E. Moore.
Jean Pichoud
Inventor
By
Attorney

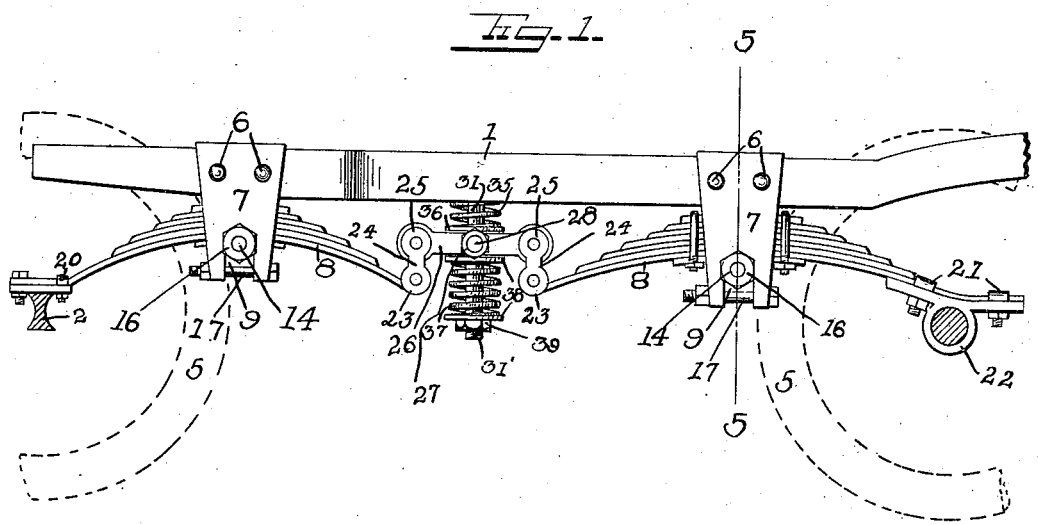
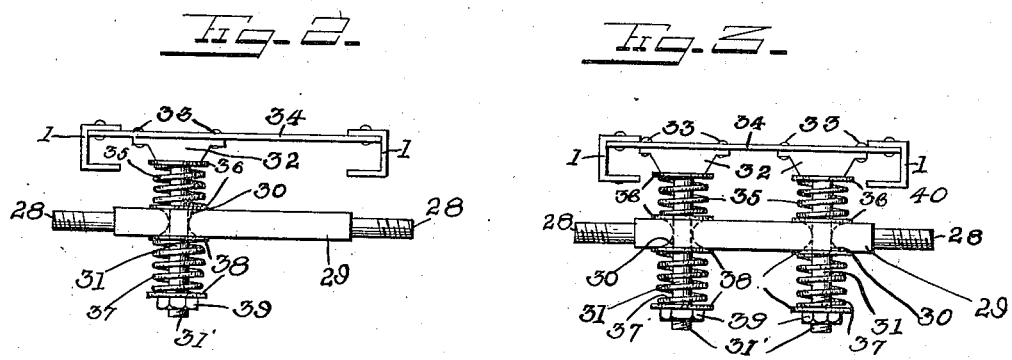

UNITED STATES PATENT OFFICE.

JEAN PICHOUD, OF NEW YORK, N. Y.

VEHICLE SPRING-GEAR.

1,147,439.  Specification of Letters Patent.  Patented July 20, 1915.

Application filed April 5, 1915. Serial No. 19,186.

*To all whom it may concern:*

Be it known that I, JEAN PICHOUD, a citizen of the Republic of France, residing at New York city, in the county of New York and State of New York, have invented certain new and useful Improvements in Vehicle Spring-Gear, of which the following is a specification.

My invention relates to improvements in vehicle spring gear, particularly designed for use upon automobiles, the leading object being the provision of a spring gear which will distribute the weight, load or strain equally upon the springs and insure a smooth and even riding of the vehicle.

Another object of my invention is the provision of a spring gear which will act to absorb the shock or jar upon the springs and which will be capable of withstanding the most severe service or hard usage without fear of damage to the gear or vehicle.

Another object of my invention is the provision of a spring gear which will form a perfect cushion or shock absorber and which will possess merit in point of simplicity, durability and cheapness of construction and prove in every respect reliable, efficient and practical.

To attain the desired objects my invention consists of a vehicle spring gear embodying novel features of construction and combination of parts substantially as shown, described and claimed.

Figure 1 represents a side elevation of the spring gear, the front and rear axles being shown in section and the wheels in dotted lines. Fig. 2 represents a detail view of the shock absorbing or equalizing spring member disposed between and connecting the inner ends of the leaf springs. Fig. 3 represents a detail view of a modified form of equalizing spring member, designed for use upon trucks or heavy vehicles. Fig. 4 represents a top plan view of the spring gear the frame being omitted and the axles and wheels shown in dotted lines, and Fig. 5 represents a sectional view on line 5—5 of Fig. 1.

Referring by numeral to the drawings in which similar characters denote corresponding parts in all the views of the drawings, the numeral 1 designates the open rectangular frame structure, 2 the front axle, 4 the differential mechanism on the rear axle and 5 the wheels, all of which parts are of usual construction and in connection with which my spring gear is employed.

Upon the side rails of the frame structure in front and rear pairs and secured by fastenings 6, are the spring receiving stirrups 7 forming boxes for the series of leaf springs 8, which stirrups have in the lower ends slots 9, receiving guide blocks or washers 10, having openings 11, in line with openings 12, of the blocks 13, in which are mounted pins 14, having threaded ends 15, to receive nuts 16.

From this construction it will be noted that upon the frame at the front and rear are secured in pairs stirrups which form inverted open boxes and that in said boxes are mounted the series of leaf springs 8, which by reason of the washers 10, blocks 13 and pins 14, have a vertical play in said stirrups and to secure the springs from improper movement or detachment I use the bolts 17, which pass through openings 18, in the stirrups as clearly shown in Figs. 1 and 5.

The leaves of the springs are secured together by vertical bolts 19, and the outer ends of the front set of springs are secured by clamps 20 to the front axle, while the outer ends of the rear set of springs are secured to clamps 21, which have bearings 22, thereon for the rear axle.

It will thus be seen that the four leaf springs members have their outer ends connected to the front and rear axle, with their main or central portions mounted and guided in the stirrups or boxes secured to the frame, and to the inner ends of said springs are secured the lower ends 23, of the links 24, whose upper ends 25, are secured to the longitudinal bars 26, all of which provides a free or swinging connection between the inner ends of the four leaf springs.

The pair of bars or plates 26, are each formed centrally with an opening 27, which receives the threaded reduced ends 28, of the cross or transverse connecting rod 29, having a vertical opening 30, guiding a depending stud 31, secured to a lug 32, fastened at 33 to the central frame bracket 34, secured to the side rails of the frame.

It will thus be apparent that the main frame structure has mounted and secured centrally thereon the transverse bracket or support 34, and from this support depends the stud 31, which passes through the connecting rod 29, and is movable thereon and is supported with its ends exposed both above the said rod 29, and around the stud above the rod 29 is placed the coiled spring 35, exerting its tension against washers 36, while on the end of the stud below rod 29, is placed the heavier coiled spring 37, which bears against the washers 38, and the lower spring is secured and its tension may be regulated by the nut 39, on the threaded end 31′, of the stud 31.

The form of cushion or spring support for the connection of the inner ends of the springs shown in Fig. 2 may be employed or the construction shown in Fig. 3 may be used for heavy vehicles or trucks in which construction a pair of cushion spring members 40 are used whose construction is identical with that described and shown in Fig. 2.

It will be understood from the drawings and description that the front and rear sets of springs have their outer ends properly supported from the front and rear axles and the stirrup shaped boxes which receive said springs, and that the inner ends of the springs are connected to permit the proper play or accommodating movement and that the connections for the inner ends of the springs have a cushion or spring support from the frame, which support forms an equalizer insuring easy and smooth riding of the vehicle, long life to the springs and general efficiency in every particular.

I claim:

1. In vehicle spring gear, the combination with the frame, wheels and axles of a vehicle stirrup shaped boxes secured to the frame, leaf spring members mounted in said boxes and having a vertical play therein, connections for the leaf springs having a free movement and spring supports for said connections, said supports consisting of a transverse frame bar, and spring connections depending from said bar.

2. In vehicle spring gear, the combination with the frame, wheel and axles of a vehicle stirrup shaped boxes secured to the frame, leaf spring members mounted in said boxes and having a vertical play therein, connections for the leaf springs having a free movement and spring supports for said connections, said supports consisting of a frame support, a stud depending therefrom, a cross rod guiding said stud, said rod being connected to the leaf spring connections, and cushion springs on said stud and arranged above and below said cross rod.

3. In combination with the frame, open boxes or stirrups and leaf spring members mounted in said boxes, links connected to the inner ends of said leaf springs, bars connecting said links, cross rods having their ends mounted in said bars, a stud having vertical movement in said rod, a support for said stud secured to the frame, and springs coiled around said stud above and below the rod forming a cushion between the frame rod, links, and leaf springs.

In testimony whereof I affix my signature in presence of two witnesses.

JEAN PICHOUD.

Witnesses:
GAYLORD U. SMITH,
CHAS. W. SHAY.

Copies of this patent may be obtained for five cents each, by addressing the "Commissioner of Patents. Washington, D. C."